United States Patent
Reugels et al.

(10) Patent No.: US 9,777,773 B2
(45) Date of Patent: Oct. 3, 2017

(54) SEAL AND ROLLER BEARING

(71) Applicants: Michael Reugels, Knetzgau (DE); Philipp Bernreuther, Waigolshausen (DE); Claudio Foti, Poirino (IT); Héctor Villalobos, Torino (IT)

(72) Inventors: Michael Reugels, Knetzgau (DE); Philipp Bernreuther, Waigolshausen (DE); Claudio Foti, Poirino (IT); Héctor Villalobos, Torino (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/092,053

(22) Filed: Apr. 6, 2016

(65) Prior Publication Data

US 2016/0298689 A1    Oct. 13, 2016

(30) Foreign Application Priority Data

Apr. 9, 2015    (DE) .......................... 10 2015 206293

(51) Int. Cl.
| | | |
|---|---|---|
| *F16C 33/76* | (2006.01) | |
| *F16C 33/66* | (2006.01) | |
| *F16J 15/16* | (2006.01) | |
| *F16C 33/78* | (2006.01) | |
| *F16J 15/3204* | (2016.01) | |
| *F16C 19/38* | (2006.01) | |

(52) U.S. Cl.
CPC ...... *F16C 33/7856* (2013.01); *F16C 33/7823* (2013.01); *F16C 33/7876* (2013.01); *F16C 33/7886* (2013.01); *F16J 15/3204* (2013.01); *F16C 19/388* (2013.01); *F16C 33/664* (2013.01); *F16C 2322/12* (2013.01)

(58) Field of Classification Search
CPC .. F16C 19/388; F16C 33/664; F16C 33/7823; F16C 33/7856; F16C 33/7876; F16C 33/7886; F16C 2322/12; F16J 15/3204
USPC ....... 384/477, 482, 484–485, 548, 558, 572, 384/571; 277/345, 590, 595, 596
See application file for complete search history.

(56) References Cited

U.S. PATENT DOCUMENTS

| | | | | |
|---|---|---|---|---|
| 3,203,740 A | * | 8/1965 | Peickii ................ | F16C 33/7853 277/361 |
| 3,473,856 A | * | 10/1969 | Helms .................. | F16C 33/783 277/375 |
| 4,692,040 A | * | 9/1987 | Ebaugh .................. | B21B 31/07 277/551 |
| 5,232,292 A | * | 8/1993 | Stackling ............ | F16C 33/7806 277/375 |
| 5,362,159 A | | 11/1994 | Kufner et al. | |
| 5,385,352 A | * | 1/1995 | Kurose ................ | F16C 33/783 277/551 |

(Continued)

FOREIGN PATENT DOCUMENTS

DE    102009012076 A1    9/2010

*Primary Examiner* — Marcus Charles
(74) *Attorney, Agent, or Firm* — Bryan Peckjian; SKF USA Inc. Patent Dept.

(57) ABSTRACT

A roller bearing seal includes an insert part and a polymer part connected to the insert part, and the insert part includes an annular-disc-shaped middle section having a radially inner deflection and a radially outer deflection, and a first ratio (L2/L1) of an axial length (L2) of the outer deflection to an axial length (L1) of the inner deflection is less than 0.65.

17 Claims, 2 Drawing Sheets

(56) References Cited

U.S. PATENT DOCUMENTS

| | | | | |
|---|---|---|---|---|
| 5,713,577 | A | * | 2/1998 | Lannert ............... F16C 33/7853 277/317 |
| 6,217,223 | B1 | * | 4/2001 | Brockmuller ......... F16C 33/543 384/470 |
| 6,241,396 | B1 | * | 6/2001 | Shimomura .......... B21B 31/078 277/551 |
| 6,289,572 | B1 | * | 9/2001 | Lannert ............... F16C 33/7853 29/527.2 |
| 8,702,313 | B2 | * | 4/2014 | Liang .................... F16C 19/388 277/345 |
| 8,864,384 | B2 | * | 10/2014 | Ohba ................. F16C 33/7856 277/353 |
| 9,222,516 | B2 | * | 12/2015 | Furukoshi ........... F16C 33/7853 |

* cited by examiner

SEAL AND ROLLER BEARING

CROSS-REFERENCE TO RELATED APPLICATIONS

This application claims priority to German patent application no. 10 2015 206 293.7 filed on Apr. 9, 2015, the contents of which are fully incorporated herein by reference.

TECHNOLOGICAL FIELD

The disclosure is directed to a seal for a roller bearing, and to a roller bearing including a seal.

BACKGROUND

Roller bearings used in roller mill applications, in particular sealed four-row tapered roller bearings, are primarily lubricated using grease or oil (e.g., oil-air). Regardless of the lubrication used, the bearing seal must resist the escape of the lubricant from the bearing interior. In addition, the seal must be designed such that the forces acting on it during handling and during bearing operation do not release it from the outer ring and such that the seal is not deflected too greatly at the seal inner diameter (deformed or bowed). The term "bowed" refers to the deforming of a seal in regions that were previously flat such that they become, for example, non-round and/or conical.

A multi-row roller bearing is shown in U.S. Pat. No. 4,692,040. It can be seen from the Figures of that patent that there is a relatively large distance from the axially outer ends of the rolling elements to the axial ends of the roller bearing. This region is used for a roller cage and a seal.

SUMMARY

One aspect of the present disclosure is to provide a roller bearing that has a high load-carrying capacity even when seals are present in the bearing. In particular, an aspect of the disclosure is to make the load-carrying capacity of a roller bearing that includes a seal essentially equivalent to the load-carrying capacity of an open bearing, one that does not include a seal.

A seal for a roller bearing comprises an insert part and a polymer part connected thereto, wherein the insert part comprises an annular-disc-shaped middle section from which radially inner and radially outer deflections extend. In the direction normal to the disc-shaped middle section, the ratio of the axial length of the outer deflection to the axial length of the inner deflection is less than 0.65 and, in particular, less than 0.55. The polymer part can preferably be an elastomer or a rubber. The insert part can preferably be a metal insert part, in particular a metal-plate insert part. One problem that often occurs with respect to the seals of roller bearings involves bowing of the seal. Due to construction conditions the seals have a particularly significant radial extension, and due to varying thermal stresses and mechanical influences the seals tend to be non-round. Thus the seals can be nominally flat in their central region. Due to the bowing the seals tend to be conical, i.e., they have an axial offset from their outer diameter to their inner diameter. Here out-of-roundnesses can also occur which reduces the sealing ability of the seal. Using insert parts can reduce but not sufficiently prevent the problem. For this reason (angular) deflections are formed at the radially outer and radially inner edges of a disc-shaped section of the insert part. Due to these angular deflections the second moment of area (geometrical moment of inertia) of the seal is increased, which reduces the tendency of the seal to bow. It was concluded therefrom in the prior art that the angular deflections on both the outer and the inner edges of the seal needed to be equal. Here it was concluded in particular that the length of the angular deflections is substantially identical in both angular deflections. As an essential aspect of the disclosure this conventional thinking was overcome, and it was recognized that the bowing may only reduce the radially outer-lying angular deflection to a limited degree. It was thus recognized that this outer angular deflection can have a lesser angular deflection length than that of the inner angular deflection. A small degree of outer angular deflection can also be compensated by a relatively increased length of the inner angular deflection. Now it is the case that in many roller bearings the axial orientation of the rollers does not correspond to the bearing axial direction, but rather the radial inner bearing surfaces have a conical shape in the sense that the raceway radius increases with the distance to the axial end. The rollers thus lie oblique. The spacing of the roller end adjacent to the axial end of the roller bearing is less on the radially outer side than on the radially inner side. Thus there is less space for the seal on the radially outer side. As described above, it was recognized that the angular deflection can be less strongly pronounced in the radially outer direction than in the radially inner direction. Therefore, on the whole, less axial space need be used for the seal. In other words: the axial end of the raceway of the outer bearing ring can now lie closer to the axial end of the bearing because less space is needed to accommodate the shorter angular deflection of the insert part. Longer rolling elements can thus be used with an unchanged length of the roller bearing, and this improves the load-carrying capacity of the bearing. The insert part is essentially U-shaped or C-shaped, and the angular deflection lengths are dimensioned based on the U on the side of the angularly deflected flanks up to the ends of the flanks. The mentioned direction normal to the disc preferably corresponds to the bearing axial direction.

The above-mentioned limit value of less than 0.65 means that the seal is essentially wedge-shaped in section and thus makes effective use of the space that lies between the axial end of the rolling element, considering the extension of the bearing cage, and the axial end of the roller bearing. The mentioned value is suitable precisely when the angle of the raceway of the rolling-element bearing on the inner bearing ring to the bearing axial direction is smaller than 18°. The smaller value of less than 0.55 is suitable precisely with larger angles of the inner raceway. The above-mentioned ratio is preferably greater than 0.2.

In particular, the ratio of the total axial width of the seal at its outer diameter to a cross-sectional height of the seal preferably falls in a range from 0.05 to 0.35 and in particular from 0.1 to 0.15. Here the cross-sectional height of the seal extends in the radial direction from a radially outer-lying radial centering surface to the radially inner-lying end of a seal lip of the seal in its non-installed (non-stressed or non-deflected) state. Using a ratio below the disclosed range leads to a very small axial width of the seal at the outer diameter and thus to an axially very small receiving section in the end side of the outer ring. Due to these limited spatial conditions it is difficult to produce a radial shoulder in the receiving shoulder in the outer bearing ring where the polymer section that has been increased in diameter engages the seal and secures the seal axially in the outer bearing ring. Using a ratio above the disclosed range leads to a very large axial width of the seal at the outer diameter and thus to a receiving section in the end side of the outer ring that is very large axially. The extending of the outer-ring raceway, which is critical for the lengthening of the rollers, can thus not be embodied to the same degree as with a narrow seal design. The full potential of a roller lengthening can therefore not be exploited, and load factor improvement is also not realized.

The ratio of the total axial width of the seal near the inner diameter to a cross-sectional height of the seal can advantageously fall in a range from 0.15 to 0.45, and in particular from 0.25 to 0.35, and thus in the not-installed state of the seal the cross-sectional height of the seal extends in the radial direction from the radial centering surface to the radially inner-lying end of a seal lip of the seal. A ratio below this range leads to a smaller axial width of the seal, which negatively impacts the rigidity or stiffness of the seal and thus the resistance to deformation or the deflection (bowing) of the seal under the influence of force (e.g. due to displaced grease, overpressure with oil-air lubrication). Another problem with a very small axial width is that the seal lip that is in contact with the inner-ring seal surface more closely approaches the end side of the inner ring, into which in many cases lubricant grooves are incorporated. Thus minimum distances between the seal lip and the inner-ring side surface or lubricant-groove base can no longer be maintained, and there is the risk of damage to the seal lip or a loss of seal effect. Ratios higher than this range can lead to a greater axial width, whereby the minimum distances between the seal and the rolling element (roller) cannot be maintained. This in turn can mean that the full potential of a roller lengthening cannot be exploited, and load factor improvement is also not fully realized.

In particular, the ratio of the material thickness of the insert part, preferably of a metal insert part, to the cross-sectional height of the seal preferably falls in a range from 0.02 to 0.1, and in particular from 0.03 to 0.07. Here in the not-installed state of the seal the cross-sectional height of the seal extends in the radial direction from the radial centering surface to the radially inner-lying end of the seal lip of the seal. The seal comprises the insert part (e.g., metal plate), which is provided with a polymer overmolding. Since the insert part has significantly higher strength properties than the polymer material, the rigidity of the seal and thus the resistance against deflection (bowing) is primarily dependent on the material properties of the insert part. Therefore for the ratio described here (in the exemplary embodiment: T/H) the seal thickness is not defined as including the polymer coating, but only as the thickness of the insert part. Ratios below this range leads to a very thin support ring without sufficient strength or stiffness to prevent the seal from deforming or deflecting (bowing) under the influence of force (e.g. due to displaced grease, overpressure with oil-air lubrication). Resistance against the pressing-out of the seal from the outer-ring retaining groove is also negatively influenced by a very thin support ring. Exceeding this ratio, on the other hand, leads to a very thick support ring and thus to large total thickness of the seal ring, and a minimum distance between the seal inner side and the bearing cage cannot be maintained. This in turn means that the full potential of a roller extension cannot be exploited, and load factor improvement is also not fully realized.

In particular, an annular-disc-shaped central section of the insert part is flat or in particular deviates by less than 5° from flatness. With such a deviation the annular-ring-shaped central section would in particular be conical. The space required in the bearing axial direction is minimized precisely with a flat and/or even embodiment of the central section of the insert part.

It is further advantageous if the insert part has no further deflections other than the two deflections mentioned above. This comprises in particular that the mentioned deflections are themselves also free from further deflections. Due to the manufacturing method each deflection is cost intensive and the space requirement of the seal thus obtained is increased.

In particular the inner deflection is conically shaped and oriented at an angle of 30°+/−20°, preferably 30°+/−15°, to the bearing axial direction. It can also be said that the inner deflection is shaped like the surface of a truncated cone. This means that the diameter of the inner deflection decreases going out from the disc-shaped central section. In this way the radial extension of the disk-shaped component of the seal can be reduced. At the same time the length of the deflection (measured in its longitudinal extension) is increased and for both reasons the bowing is reduced.

Furthermore the ratio of the deflection length of the radially inner deflection to the total width of the seal near the inner diameter is preferably greater than 0.3. Due to the fact that starting from the bearing interior a force is exerted on the side surface of the seal (e.g., during an initial greasing of the bearing due to displaced grease in operation or overpressure with oil-air lubrication) a certain stiffness of the seal against deformation or the deflection (bowing) of the seal under the influence of force is necessary. This stiffness is primarily achieved due to the axial width of the radially inner deflection of the insert part. In order to achieve a sufficient stiffness the width (axial) of the inner deflection of the insert part should be at least 30% of the total axial width of the seal. Ratios below this ratio lead to a reduced stiffness of the seal and thus to a lower resistance against deformation or the deflecting (bowing) of the seal under the influence of force. In addition, due to the increased deflection of the seal the overlap is reduced between the increased-in-diameter polymer section at the outer diameter of the seal and the radial shoulder introduced in the receiving shoulder, whereby the retaining force of the seal in the outer ring is reduced.

A roller bearing, in particular a cylindrical or tapered roller bearing, comprises a plurality of rolling elements that are disposed between an inner bearing ring and an outer bearing ring, and sections of a bearing cage are disposed between the rolling elements in order to align the rolling elements relative to one another. A seal is disposed on at least one axial end of the roller bearing, the seal includes an insert part, and the insert part includes an (angular) deflection on at least one inner diameter. Here there is an overlapping in the radial direction of a section of the bearing cage and the deflection, and the axial width of the overlapping is at least 100% of the material thickness of the bearing cage. If the thickness of the bearing cage is inconsistent due to the deformation of the underlying metal plate, then in this analysis the thickest material thickness is used. The term "overlapping" can in particular be understood such that a space can be spanned vertically from the bearing cage towards the bearing radial direction and sections of the insert part are located inside this space. Due to this construction the maximum extension of the seal in the bearing axial direction can be reduced.

In particular, the ratio of the radial extension of the seal to the cross-sectional height of the roller bearing falls in the range from 0.4 to 0.7, and in particular from 0.5 to 0.6, wherein in the not-installed state of the seal the radial extension of the seal extends in the radial direction from a radial centering surface to the radially inner-lying end of the seal lip of the seal. The cross-sectional height results from the difference between the outer diameter of the outer bearing ring and the inner diameter of the inner bearing ring of the roller bearing. Ratios lower than this ratio lead to a very small seal cross-section height and thus to an atypical geometry on the end side of the outer ring. For fixing the seal the outer ring must have a substantially smaller diameter of the receiving shoulder, which in addition unfavorably influences the material expense of the outer ring and thus the material and manufacturing costs. In order to provide an axial abutment surface on the outer ring for the exact positioning of the seal, in this case the reduced-diameter region with receiving section must be axially enlarged, and this in turn negatively impacts the ability to increase the rolling-element length. Exceeding this ratio leads to a very large seal cross-section height and thus to an increased sensitivity with respect to pressing-out or deflecting (bowing) of the seal with forces due to, for example, lubricant, since the contact surface of the seal would be significantly increased. In addition, a large seal cross-section height reduces the cross-section height of the remaining outer-ring end side, which is necessary for axial clamping of the outer ring in the housing. In addition, a too-low cross-section height of the outer-ring end side can negatively impact handling during the manufacturing process.

BRIEF DESCRIPTION OF THE DRAWINGS

Embodiments of the disclosure are explained in more detail below with reference to the Figures, wherein.

DETAILED DESCRIPTION

Figure 1:
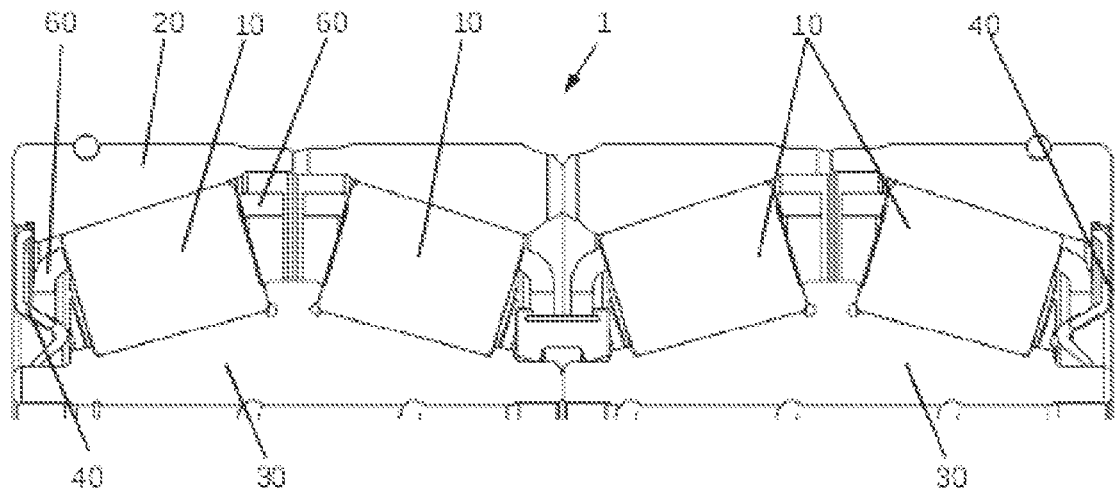
FIG. 1 is an axial section through a four-row tapered roller bearing.

FIG. 1 shows a sealed four-row tapered roller bearing 1 having a seal 40 disposed externally next to each of the axially outer-lying rows of rolling elements of the tapered roller bearing. The tapered roller bearing 1 comprises two inner bearing rings 30 that each form a raceway for two of the four rows. The rolling elements 10 are disposed radially outside the inner bearing rings 30, and each row of the rolling-element bearing 10 is associated with an outer bearing ring 20 that forms a raceway for the rolling elements in a row. The outer diameter of the roller bearing is preferably between about 150 mm and 2500 mm. In the exemplary embodiment the rolling elements 10 are conical or truncated-cone-shaped. Advantages provided by this disclosure can also be used with cylindrical roller bearings.

Figure 4:
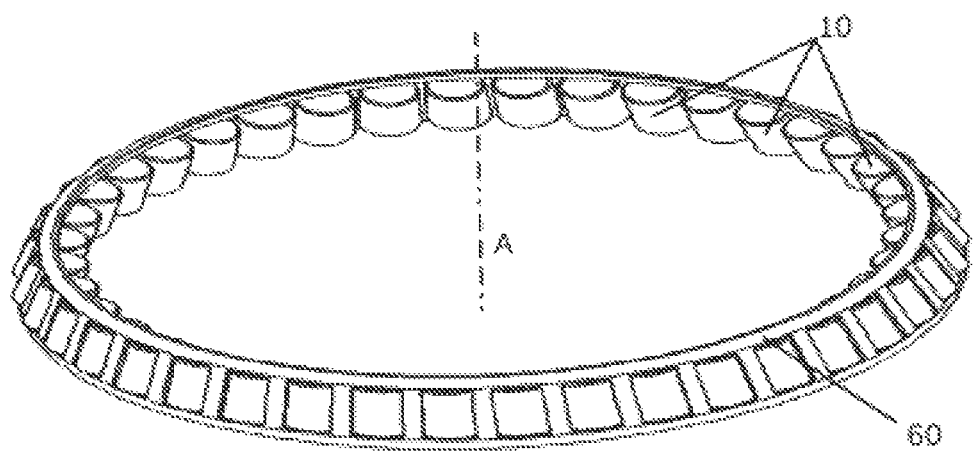
FIG. 4 is a perspective view of the rollers of the tapered roller bearing of FIG. 1 mounted in a bearing cage.

A bearing cage 60 is illustrated in FIG. 4 with a plurality of rolling elements 10 mounted therein. The bearing cage 60 maintains a constant spacing of the rolling elements 10 and prevents them from contacting one another. Parts of the bearing cage 60 are also shown in FIG. 1. An axially outer end of the bearing cage 60 is located between an axial outer end of the rolling elements 10 in one row and an axial end of the roller bearing. This axially outer end of the bearing cage 60 includes a flange 15 bent radially inward, which flange 15 serves to reduce the axial dimension of the bearing cage 60 and to increase its stiffness. An annular and/or disc-shaped region exists between the flange 15 and the axial end of the roller bearing. The seal 40 is located within this region. The region is preferably flat and lies in a plane perpendicular to the bearing axis A in order to keep its axial extension as small as possible. If the roller bearing has an outer diameter of 400-600 mm, then the distance from the bearing cage 60 to the seal 40 is at least 1 mm. The distance can preferably also be at least 2 mm.

Figure 3:
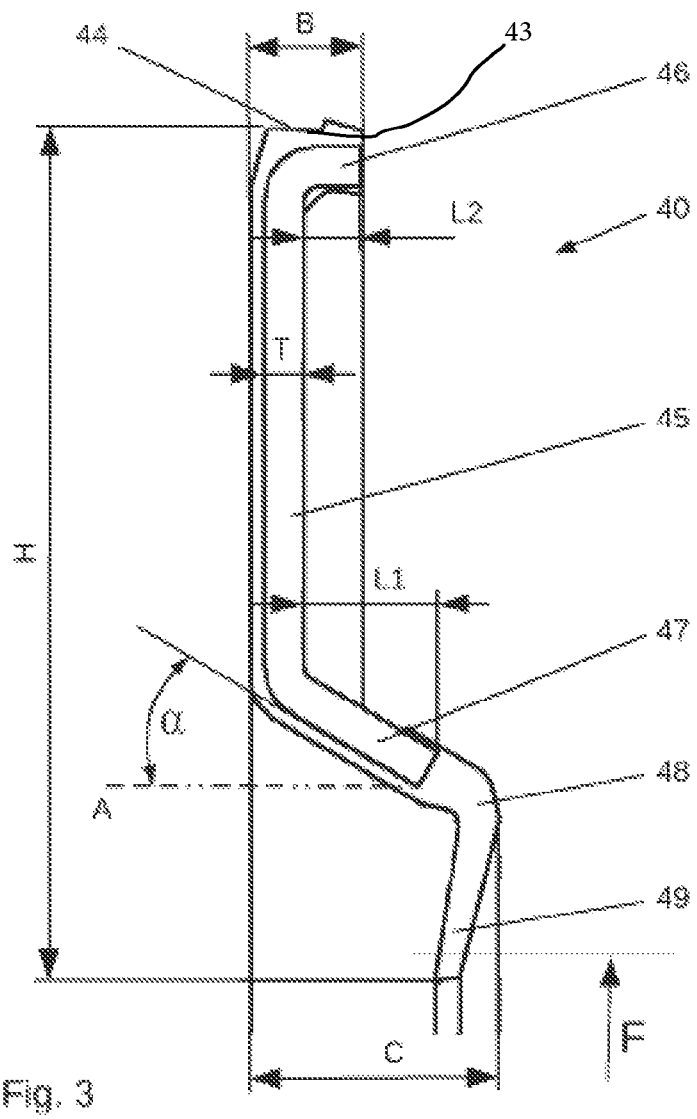
FIG. 3 is an axial section through one half of a seal for the tapered roller bearing of FIG. 1.

The seal 40 is shown in detail in FIG. 3 and comprises an insert part 45 to which a resilient (e.g., polymer or plastic) seal portion is permanently connected, for example, by overmolding it to the insert part 45. The insert part 45 has a material thickness T and a radially central disc-shaped section, and its upper (radially outer) end has a circumferentially outer deflection 46 that has a length L2 (measured from the axially inner side of the insert part 45), which extends perpendicular to the disc-shaped section, generally parallel to the bearing axis A. The radially inner end of the disc-shaped section of the insert part 45 has a second inner deflection 47, which extends in the same direction as the outer deflection 46 and has the length L1. The angle $\alpha$ of this angular deflection is 30° relative to the bearing axial direction A. The disc-shaped region of the insert part 45 is preferably flat; however, it can also be slightly domed or conical.

The outer bearing ring 20 includes a profiled, radially inwardly facing circumferential edge that forms a radial centering surface 44 for a radially outer-lying surface 43 of the seal. The outer-lying surface 43 of the seal includes a barb or hook-shaped portion that engages with a corresponding projection on the radial centering surface 44. The seal is attached to the outer bearing ring 20 via a corresponding interference-fit hooking of the hook-shaped portion. In addition, a friction-fit can act in a supporting manner via a (radial) fit. A seal lip 49 is disposed radially inward of the inner deflection 47, which seal lip 49 forms a running area configured to contact a corresponding raceway 33 of the inner bearing ring 30. The raceway 33 has a diameter F. Due to an overlap of the nominal inner diameter of the seal lip 49 (see FIG. 2 with dashed line) and the outer diameter of the raceway 33, a good sealing is ensured. The tightness of the dynamic sealing point on the inner ring 30 is ensured by the flexible polymer seal lip 49. In contrast to conventional seal designs, the seal lip 49 has no coil spring, and this reduces the amount of space required for the seal lip 49, both the amount of axial and radial space required. The raceways of the rolling elements 10 on the inner bearing ring 30 have an angle of inclination to the bearing axial direction A of 14°. In alternative exemplary embodiments the angle of inclination can fall in the range from 10° to 40°. This causes the radially outer edges 14 or ends of the rolling elements 10 to project farther in the axial direction than the radially inner edges 16 or ends of the rolling elements, and thus provides a radially inner-lying region (radially inward of the radially outer edge 14) into which a part of the seal can extend or be received.

Another dimension of interest for characteristic value formation is the total width B of the seal near the outer diameter. For this measurement, it is not the insert part 45 that is considered but rather the total thickness of the seal and its overmolding. The free ends of the deflections 46, 47 are specifically overmolded in order to improve the connection of the insert part 45 to the overmolded or polymer part 48. The total width C of the seal near its inner diameter is not measured at the end of the seal lip 49. Rather, the seal lip 49 is oriented in the opposite direction to the (radially) inner deflection 47, so that a U-shaped structure arises and it is measured up to the base of this "U," in other words, at the axially widest portion of the seal. The total widths B and C are measured axially. Accordingly the cross-sectional height H results as the maximum extension, measured in the radial direction, when the seal lip 49 is not in the installation condition, i.e. not elastically strained. The dimension BH describes the cross-section height of the bearing and thus includes the installation connection dimension of the bearing.

Four-row tapered roller bearings are often used in extreme environments, for example, in bearing assemblies of work rollers in rolling stands that are constantly exposed to cold water and to the high stresses of the steel processing process. Four-row tapered roller bearings are available in open and sealed embodiments. The seals of the sealed variant should prevent both the penetration of water and dirt into the bearing interior and the escape of lubricant and thereby ensure a long service life of the bearings.

In order to ensure a sufficient resistance against the pressing-out of the seal from the outer ring as well as against a bowing of the seal, conventional seal designs for multi-row tapered roller bearings generally include a metal-plate carrier having multiple angular deflections that is overmolded with fluoro rubber. This metal-plate carrier requires a large axial space in conventional bearing interiors.

Beneficially, the disclosed seal design is substantially thinner in the axial direction that conventional seals for (four-row) tapered roller bearings. At that same time, it provides sufficient resistance against pressing-out from the outer ring and sufficient stiffness against deflection or bowing. The disclosed seal design comprises a metal-plate insert part having a material thickness and that has only two folded angular deflections. The reduced material thickness as well as the significantly simpler geometry of the metal plate insert part as compared to conventional seals reduces material and manufacturing costs. On the other hand specifically the axial extension of the seal at the seal outer diameter and the seal inner diameter is significantly reduced. This reduction of the axial width at the seal outer diameter allows for the possibility of increasing the rolling-element length of each row because the space made available by the smaller seal width can be used to accommodate longer rolling elements. The rollers can accordingly also be lengthened, and despite the lengthening still have sufficient distance (clearance) to the seal. Alternatively, instead of lengthening the rollers, the axial width of the bearing could be reduced.

Due to the reduction of the axial width at the outer and inner diameter of the seal it is also possible to reduce the axial distance between the bearing cage and the seal side surface. This is because, due to the changed seal geometry, the axial overlap of the bearing cage in the annular free space formed by the seal can be increased, and thus the bearing cage can be positioned as closely as possible, taking into account certain safety spacings, to the inner seal side surface. Due to the overall small axial space requirement of the seal and the consequent reduction of the distance between bearing components and seal by which an increase of the roller length is possible, the load factor of the rolling-element bearing can be increased without increasing bearing external dimensions. A load factor increase with respect to the conventionally sealed (four-row) tapered roller bearing offers a technical advantage specifically with high-load applications as are found in rolling mills, since a longer bearing service life can thereby be achieved.

The assembly or attachment of the disclosed seal in the outer ring occurs with the help of a combined friction-fit and interference-fit. In the outer ring starting at the axially outer end, a (cylindrical) shoulder is turned-in, which shoulder includes an annular groove or radial shoulder embodied larger in diameter. The outer diameter or outer-edge section of the seal has a (polymer) section increased in diameter (wedge-shaped), which engages in the radial shoulder provided in the outer ring and secures the seal axially in the outer ring. In addition, the polymer coating on the outer diameter of the seal has a certain overlap with respect to the (cylindrical) shoulder surface in the outer ring such that, after the installation of the seal, a friction-fit forms, which provides an additional resistance against the pressing-out of the seal from the outer ring and also ensures the necessary tightness (static seal).

An axial stop surface in the receiving shoulder determines the axial position of the seal in the outer ring. This is necessary since a certain distance of the contact point between seal lip 49 and the inner bearing ring with respect to the inner ring side surface is used, which in many cases also contains lubrication grooves. The seal effect is ensured by an optimized pressing force of the seal lip 49 on the inner-ring surface 33, which is primarily determined by the seal lip geometry as well as by the overlap between the seal lip diameter and the inner-ring seal diameter. Further positive aspects due to the optimized pressing force of the disclosed seal include low leakage as well as less frictional torque, which in turn leads to a lower temperature development of the frictional contact between seal lip and inner-ring surface. In addition, a springless seal lip is more cost-effective to manufacture and eliminates the risk of component damage that could be caused by a coil spring detaching from the seal lip.

A further advantage of the disclosed seal and the associated load rate increase is a design harmonization of the sealed and open variants of a four-row tapered roller bearing with identical external dimensions. With the use of the conventional seals, due to the shortened rollers made necessary by the presence of a conventional seal, the sealed variant with the same external dimensions has a lower load rate than the open variant that uses longer rollers. With the use of the disclosed seal this load rate difference is substantially eliminated, which makes a separate open variant with different internal bearing geometry unnecessary. This means that an open variant can be built without seals using the same bearing components as for the sealed variant. Using identical rings, rollers, and (bearing) cages for both sealed and open variants is more efficient and more cost-effective.

Figure 2:
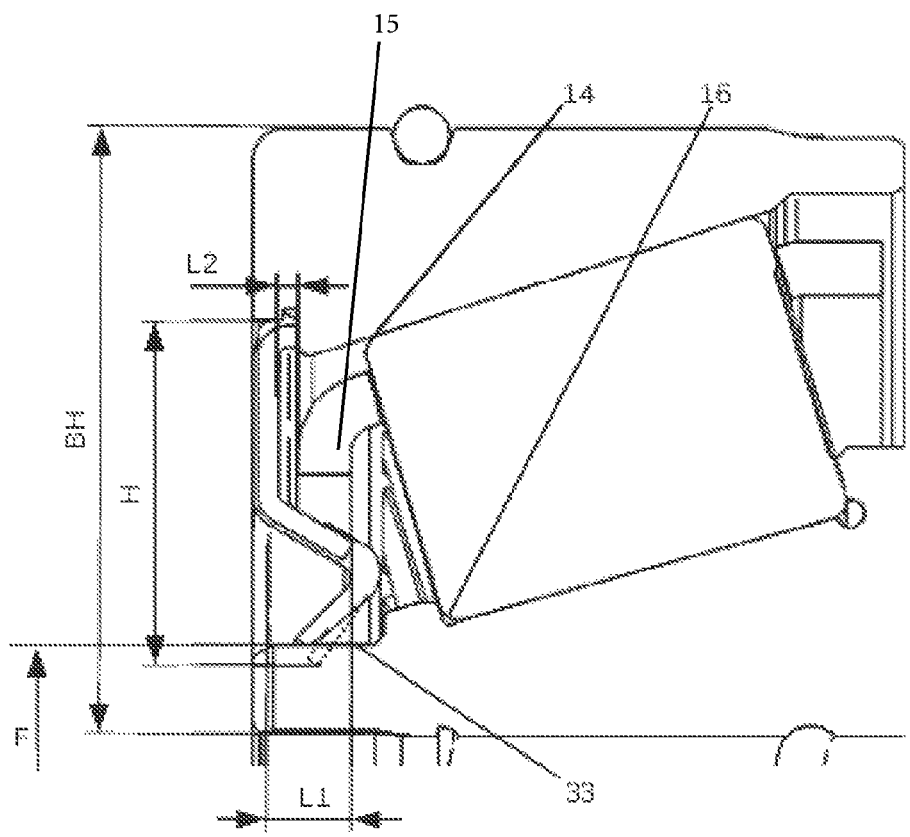
FIG. 2 is a detail of one of the rows of the tapered roller bearing of FIG. 1.

In FIG. 2 the dimensions H and F are shown. H indicates the cross-section height in the radial direction of the seal 40. And F describes the diameter of the raceway 33 for the seal lip 49 on the inner bearing ring 30. The ratio H/F preferably falls between 0.05-0.15. This ratio of cross-section height of the disclosed seal to the diameter of the seal surface on the inner ring can in particular also fall between 0.07-0.1. Corresponding disadvantages with falling-below or exceeding this ratio were already discussed for the ratio of the cross-section height H to the cross-section height BH of the bearing.

The advantages described with respect to a four-row tapered roller bearing can also be used for other roller bearings having other numbers of rows, such as, in particular, single row or double row roller bearings. Cylindrical rollers or barrels can also be used instead of tapered rollers.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved seals.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Roller bearing
10 Rolling elements
14 Radially outer edge of the rolling element
15 Flange of the bearing cage
16 Radially inner edge of the rolling element
20 Outer bearing ring, outer ring
30 Inner bearing ring, inner ring
33 Raceway of the seal lip 49, inner-ring surface
40 Seal
43 Seal outer surface
44 Radial centering surface
46 Outer (angular) deflection
45 Outer (angular) deflection
47 Inner (angular) deflection
48 Plastic (polymer) part
49 Seal lip
60 Bearing cage
A Bearing axial direction
B Total width (axial) of the seal near the outer diameter
C Total width (axial) of the seal near the inner diameter
BH Cross-section height of the bearing
F Diameter of the seal surface at the inner ring
L1 Angular deflection length (axial) of the inner angular deflection of the support ring
L2 Angular deflection length (axial) of the outer angular deflection of the support ring
H Cross-section height of the seal
T Material thickness of the insert part 45

What is claimed is:

1. A roller bearing seal comprising:
the roller bearing seal having an internal face configured to be oriented toward an inside of a bearing and having an external face configured to be oriented toward an outside of the bearing;
an insert part positioned along the internal face of the roller bearing seal, wherein the insert part comprises an annular-disc-shaped middle section having a radially inner deflection and a radially outer deflection, and wherein a first ratio (L2/L1) of an axial length (L2) of the radially outer deflection to an axial length (L1) of the radially inner deflection is less than zero point six five (0.65), the radially outer deflection having an outer deflection axial end located distal from the annular-disk-shaped middle section, the radially inner deflection having an inner deflection axial end located distal from the annular-disk-shaped middle section;
a polymer part configured to form sealing contact with an inner ring and an outer ring of the bearing, the polymer part being connected to the insert part such that the entire external face is formed by the polymer part, the polymer part proximate the radially outer deflection not extending axially past the outer deflection axial end of the radially outer deflection; and
a seal lip formed by the polymer part, the seal lip being formed radially below the radially inner deflection and the seal lip being oriented in a direction opposite to the radially inner deflection, the seal lip not being axially overlapped by the radially inner deflection, the seal lip being the only contact between the polymer part proximate to the radially inner deflection and the bearing.

2. The seal according to claim 1, wherein a second ratio (B/H) of a total axial width (B) of the seal at its outer diameter to a cross-section height (H) of the seal is from 0.05 to 0.35.

3. The roller bearing seal according to claim 2, wherein the second ratio is from 0.1 to 0.15.

4. The seal according to claim 1, wherein a third ratio of a total axial width (C) of the seal at an inner diameter to a cross-section height (H) of the seal is from 0.15 to 0.45.

5. The roller bearing seal according to claim 4, wherein the third ratio is from 0.25 to 0.35.

6. The seal according to claim 1, wherein a fourth ratio of a material thickness (T) of the insert part to a cross-section height (H) of the seal is from 0.02 to 0.1.

7. The roller bearing seal according to claim 6, wherein the fourth ratio is from 0.02 to 0.1.

8. The seal according to claim 1, wherein the annular-disc-shaped central section is flat or deviates from flatness by less than 5°.

9. The seal according to claim 1, wherein the insert part has no angular deflections apart from the outer deflection and the inner deflection.

10. The seal according to claim 1, wherein the inner deflection is conically formed and is oriented at an angle ($\alpha$) of 30°+/−20° to a bearing axial direction (A).

11. The seal according to claim 1, wherein a fifth ratio of the axial length (L1) of the inner deflection to a total width of the seal is greater than 0.3.

12. A cylindrical or tapered roller bearing including a plurality of rolling elements disposed between an inner bearing ring and an outer bearing ring, wherein sections of a bearing cage are disposed between the rolling elements and the roller bearing seal of claim 1 is disposed at at least one axial end of the roller bearing, and wherein a section of the bearing cage overlaps at least one of the radially inner deflection and the radially outer deflection by at least 100% of a material thickness of the bearing cage.

13. The roller bearing according to claim 12, wherein a ratio of a radial extension (H) of the seal to a cross-sectional height (BH) of the roller bearing is from 0.4 to 0.7, and a cross-section height (BH) results from a difference of an outer diameter of the outer bearing ring to an inner diameter of the inner bearing ring of the roller bearing.

14. The roller bearing according to claim 13, wherein the ratio is from 0.5 to 0.6.

15. The roller bearing seal according to claim 1, wherein the first ratio is less than 0.55.

16. The roller bearing seal according to claim 1,
wherein a second ratio (B/H) of a total axial width (B) of the roller bearing seal at its outer diameter to a cross-section height (H) of the roller bearing seal is from 0.05 to 0.35,
wherein a third ratio of a total axial width (C) of the roller bearing seal at an inner diameter to the cross-section height (H) of the roller bearing seal is from 0.15 to 0.45, and
wherein a fourth ratio of a material thickness (T) of the insert part to the cross-section height (H) of the roller bearing seal is from 0.02 to 0.1.

17. The seal according to claim 16,
wherein the annular-disc-shaped central section is flat or deviates from flatness by less than 5°,
wherein the insert part has no angular deflections apart from the radially outer deflection and the radially inner deflection,
wherein the radially inner deflection is conically formed and is oriented at an angle ($\alpha$) of 30°+/−20° to a bearing axial direction (A), and
wherein a fifth ratio of the axial length (L1) of the radially inner deflection to a total width of the seal is greater than 0.3.

* * * * *